United States Patent [19]

Joyner et al.

[11] Patent Number: 4,510,071

[45] Date of Patent: Apr. 9, 1985

[54] METHANOL CONVERSION PROCESS

[75] Inventors: Richard W. Joyner, Lightwater; John J. McCarroll, Camberley; Stephen R. Tennison, Weybridge, all of England

[73] Assignee: The British Petroleum Company p.l.c., London, England

[21] Appl. No.: 636,570

[22] Filed: Aug. 1, 1984

[30] Foreign Application Priority Data

Aug. 6, 1983 [GB] United Kingdom ............... 8321255

[51] Int. Cl.$^3$ .............................................. C01B 3/22
[52] U.S. Cl. ................................................... 252/373
[58] Field of Search ................ 252/373; 502/183, 184, 502/185

[56] References Cited

U.S. PATENT DOCUMENTS

| 3,179,500 | 5/1965 | Bowen et al. | 252/373 |
| 3,541,729 | 11/1970 | Dantowitz | 252/373 |
| 3,771,261 | 11/1973 | Mandelik et al. | 252/373 |
| 3,986,350 | 10/1976 | Schmidt | 252/373 |
| 4,088,450 | 5/1978 | Kosaka et al. | 252/373 |
| 4,175,115 | 11/1979 | Ball et al. | 252/373 |

FOREIGN PATENT DOCUMENTS 2447913  4/1976  Fed. Rep. of Germany ...... 252/373

*Primary Examiner*—Natalie Trousof
*Assistant Examiner*—Bruce D. Gray
*Attorney, Agent, or Firm*—Morgan, Finnegan, Pine, Foley & Lee

[57] ABSTRACT

Methanol is converted to synthesis gas over a catalyst comprising Pd, an alkali metal, alkaline earth metal or a lanthanide on a carbon having defined surface area characteristics.

9 Claims, No Drawings

METHANOL CONVERSION PROCESS

The present invention relates to a process for converting methanol into a mixture of carbon monoxide and hydrogen.

Mixtures of carbon monoxide and hydrogen often known as "synthesis gas" or "syngas" may be used for a variety of chemical reactions. Synthesis gas represents a versatile feedstock.

Methanol is widely produced throughout the world. Methanol is itself made from synthesis gas. However methanol can conveniently be transported over long distances by tanker while synthesis gas cannot. It is therefore useful to provide a means for converting methanol into synthesis gas.

The present invention relates to a process for the conversion of methanol to a mixture of carbon monoxide and hydrogen by passing methanol over a catalyst under conditions such that the concentration of methanol in the feed is higher than the concentration of methanol in the product, which process is characterised in that the catalyst contains palladium metal dispersed on a support and a promoter which is an alkali metal, alkaline earth metal, or a lanthanide, and the support is a graphite-containing carbon having (a) a basal plane surface area of at least 100 $m^2/g$
(b) a ratio of BET surface area to basal plane surface area of not more than 5:1
(c) a ratio of basal plane surface area to edge surface area of at least 10:1.

Our copending application corresponding to U.S. Ser. No. 522 740, Pat. No. 4,476,250, and European patent application 83 304646.9 discloses a process for converting mixtures of carbon monoxide and hydrogen to methanol over the same catalyst. Whether use of the catalyst results in conversion of synthesis gas to methanol or methanol to synthesis gas will depend on the composition of the feed in relation to the equilibrium concentrations and the conditions of temperature and pressure used.

In order for the process to be a methanol decomposition process the concentration of methanol in the feed must be greater and the concentrations of CO and $H_2$ lower than the concentration in equilibrium with synthesis gas at the conditions of temperature and pressure under which it is brought into contact with the catalyst.

In some circumstances it may be convenient to use a feed which contains not only methanol but synthesis gas components. In such circumstances the temperature and pressure must be so regulated in relation to the relative quantities of methanol and synthesis gas components that decomposition is thermodynamically favoured. The required conditions can readily be calculated by skilled persons.

As the decomposition of one molecule of methanol gives rise to three molecules of synthesis gas mixture, the decomposition of methanol in the gas phase is favoured on equilibrium grounds by low partial pressures of methanol. The decomposition reaction is endothermic and increased temperatures will shift the methanol to synthesis gas equilibrium towards the production of synthesis gas. The reaction temperature, and the partial pressure of methanol which may be used in practice will depend on the ratio of methanol to synthesis gas components in the feed and the degree of conversion which is required.

In general it is preferred to use feeds substantially free of synthesis gas components. It is preferred to operate at conversions of greater than 40%, more preferably greater than 75%, more preferably greater than 95%. Although there is an equilibrium limitation on temperature, in practice the activity of the catalyst is the limiting factor. It is an advantage of the catalyst of the present invention that it gives a useful degree of conversion of methanol at low temperatures which is economically desirable. Examples of suitable temperatures are those in the range above 150° C., more preferably above 250° C. At temperatures below 200° C. the partial pressure may be 3 bar (0.3 MPa) for a pure feed, more preferably below 1 bar (0.1 MPa). Higher pressures, up to 25 bar, may be used at higher temperatures.

It is an advantage of catalysts according to the present invention that they enable high selectivies to carbon monoxide and hydrogen to be obtained. CO and $H_2$ can undergo Fisher-Tropsch type reactions over some catalysts to give hydrocarbons. Hydrocarbons are usually undesirable impurities in synthesis gas. Good selectivities to CO and $H_2$ may be obtained even at temperatures as high as 400° C.

In a gaseous feed the total pressure will depend on whether any additional components are present. With methanol partial pressures below 1 bar (0.1 mPa) it may be desirable to have additional materials present to keep the total pressure at 1 bar (0.1 mPa) or above. These additional materials may be inert diluent gases, for example nitrogen.

Catalysts of the general type used in the process of the application are disclosed in GB 1 471 233. These catalysts are disclosed as being useful for the hydrogenation, dehydrogenation and dehydrocyclisation of hydrocarbons. There is nothing in GB 1 471 233 which suggests that the catalysts used in the process of the present invention could be used for the decomposition of methanol.

Reference is made in this specification to elements from various groups of the Periodic Table. The Periodic Table referred to is that published by the United Kingdom Patent Office in the Classification Manual for Section C2 of the Patent Office classification dated 1980.

In this specification the term "alkali metal" means the Group IA elements excluding hydrogen and the term "alkaline earth metal" means the Group IIA elements excluding beryllium.

The palladium in the activated catalyst is present as the metal, as evidenced by X-ray diffraction. The palladium may be introduced on to the carbon support by impregnating with a solution of a compound of the metal.

The solvent may be a non-aqueous solvent where palladium compounds soluble in the solvent are available. However it is preferred to use water-soluble palladium compounds (e.g. halides) in the form of their aqueous solutions.

The alkali metal, alkaline earth metal, or the lanthanide may be deposited on the catalyst by impregnation with the vapour of the free element or by using the molten metal where this can be done without using very high temperatures. However the difficulties of using molten metal or metal vapour in the preparation of catalysts on a large scale will be apparent to any person skilled in catalyst preparation. It is therefore preferred to introduce the promoters in the form of a compound.

The compound is preferably a water-stable compound i.e. it can be brought into contact with water without decomposition. The most convenient way of depositing the water-stable compound on the carbon support is by impregnation with an aqueous solution, and it is therefore preferred to use water soluble salts. The solubility in water is preferably sufficient to give the required content of promoter in a single impregnation step.

Catalysts may be prepared containing only a single promoter. Alternatively mixtures of promoters may be used.

In order to obtain an active catalyst for use in the process of the present invention the catalyst preparation is carried out in such a way that catalyst poisons are not left on the catalyst. Chloride ion is believed to adversely affect the activity of the catalyst. Therefore the promoters are not deposited on the catalyst as the chloride salts because the chloride cannot then be readily eliminated from the catalyst. Where the catalyst is prepared from a palladium halide then the halogen must be eliminated by reduction before the promoter is introduced. If the palladium is not deposited on the carbon as a halide then the promoter can be deposited before or at the same time as the palladium.

It is believed to be desirable to avoid the use of sulphur and phosphorus containing compounds in the catalyst preparation and use as any liberation of sulphur and/or phosphorus during catalyst preparation and use is likely to adversely affect the activity of the catalyst.

Examples of suitable compounds which can be used to introduce the promoter are the nitrate, nitrite, carbonate, hydrogen carbonate, azide, hydroxide and acetate.

It is preferred to subject the carbon containing the palladium and promoter to a reduction with hydrogen before use rather than relying on any reduction which may take place as a result of contact with the hydrogen in the synthesis gas during the methanol synthesis step.

As explained above it may be necessary to employ two reduction steps in the preparation of the catalyst if the palladium has been deposited as a halide in order to remove the halide before the promoter is introduced.

Any water or other solvent present in the support after the palladium compound or promoter has been deposited is preferably removed before proceeding to the reduction step. This solvent removal may for example be done by heating the catalyst support at temperatures in the range 50° to 150° C.

The reduction steps may be carried out over a moderately wide range of temperature and pressure and hydrogen feed rates (space velocity), provided that the partial pressure of reduction products is kept low and that all reduction products are removed. The reduction steps are preferably carried out in the gas phase.

Examples of suitable temperature for the reduction of the palladium compounds are those in the range 100° C. to 400° C., preferably 200° C. to 300° C. Examples of suitable temperatures for the reduction of the palladium plus promoter are those in the range 100° C. to 300° C.

Examples of pressures which may be used are those in the range 0.5 to 100 bar (0.05 to 10 MPa), preferably 0.5 to 5 bar (0.05 to 0.5 MPa).

Examples of suitable GHSV are 1000 to 100 000, preferably greater than 10 000.

Optimum reduction conditions can readily be determined by persons skilled in catalyst preparation.

The carbon is preferably in particulate form eg as pellets. The size of the carbon particles will depend on the pressure drop acceptable in any given reactor (which gives a minimum pellet size) and reactant diffusion constraint within the pellet (which gives a maximum pellet size). The preferred minimum pellet size is 0.5 mm and the preferred maximum is 5 mm.

The carbons are preferably porous carbons. With the preferred particle sizes the carbons will need to be porous to meet the preferred surface area characteristics.

Carbons may be characterised by their BET, basal plane, and edge surface areas. The BET surface area is the surface area determined by nitrogen adsorption using the method of Brunauer Emmett and Teller J. Am Chem. Soc. 60,309, (1938). The basal plane surface area is the surface area determined from the heat of adsorption on the carbon of n-dotriacontane from n-heptane by the method described in Proc.Roy.Soc. A314 pages 473–498, with particular reference to page 489. The edge surface area is the surface area determined from the heat of adsorption on the carbon of n-butanol from n-heptane as disclosed in the Proc.Roy.Soc. article mentioned above with particular reference to page 495.

The preferred carbons for use in the present invention have a basal plane surface area of at least 120 $m^2/g$, more preferably at least 150 $m^2/g$ most preferably at least 200 $m^2/g$. The basal plane surface area is preferably not greater than 1000 $m^2/g$.

The ratio of BET to basal plane surface area is preferably not greater than 4:1, most preferably not greater than 3:1.

It is preferred to use carbons with ratios of basal plane surface area to edge surface area of at least 10:1, more preferably at least 20:1. most preferably at least 50:1.

The preferred carbon support may be prepared by heat treating a carbon-containing starting material. The starting material may be an oleophilic graphite e.g. prepared as disclosed in GB 1 168 785 or may be a carbon black.

However oleophilic graphites contain carbon in the form of very fine particles in flake form and are therefore not very suitable materials for use as catalyst supports. We prefer to avoid their use. Similar considerations apply to carbon blacks which also have a very fine particle size.

The preferred materials are activated carbons derived from vegetable materials e.g. coconut charcoal, or from peat or coal. The materials subjected to the heat treatment preferably have particle sizes not less than these indicated above as being preferred for the carbon support. The surface area of the starting material will always be greater than that of the carbon resulting from the heat treatment.

The preferred starting materials have the following characteristics: BET surface area of greater than 100 $m^2/g$, more preferably at least 500 $m^2/g$.

The preferred heat treatment procedure for preparing carbon supports having the defined characteristics, comprise successive (1) heating the carbon in an inert atmosphere at a temperature of from 900° C. to 3300° C., (2) oxidizing the carbon at a temperature between 300° C. and 1200° C., (3) heating in an inert atmosphere at a temperature of between 900° C. and 3000° C.

The duration of the heating in inert gas is not critical. The time needed to heat the carbon to the required maximum temperature is sufficient to produce the required changes in the carbon.

The rate at which the oxidation is carried out is not critical but care must be taken to prevent complete carbon combustion. The oxidation is most desirably carried out using a gas containing molecular oxygen e.g. air or mixtures of oxygen and a gas which is inert under the reaction conditions e.g. nitrogen or an inert (Group 0) gas.

The oxidation step is preferably carried out at a temperature in the range 300° and 600° C.

The oxidation is preferably carried out to give a carbon weight loss of at least 10% wt based on weight of carbon subjected to the oxidation step, more preferably at least 15% wt.

The weight loss is preferably not greater than 40% wt of the carbon subjected to the oxidation step, more preferably not greater than 25% wt of the carbon.

The rate of supply of oxidizing agent is preferably such that the desired weight loss takes place over at least 2 hours, more preferably at least 4 hours.

Where an inert atmosphere is required it may be supplied by nitrogen or an inert (Group 0) gas.

The quantity of palladium on the catalyst may for example be in the range 0.1 to 50% by weight based on total weight of the catalyst, preferably 1 to 20% by weight, more preferably 2 to 8% by weight of the catalyst.

We believe that the preferred relative quantities of promoter and palladium compound are best expressed as a molar ratio of palladium to promoter metal (which will correspond to the ratio of numbers of atoms). The mole ratio of promoter (expressed as the element) to palladium is preferably within the range 0.2:1 to 6:1, most preferably 2:1 to 3:1.

The relative amounts of palladium and promoter (calculated as the element) may also be expressed as a weight ratio. In general in a given weight of catalyst the weight ratio of promoter to palladium is preferably between 0.1:1 to 4:1.

The invention will now be illustrated by reference to the following example.

EXAMPLE 1

The carbon used as the support material for all catalysts in this and further examples was prepared from a commercially available extrudate activated carbon sold by Degussa A. G. Hanau, under the designation BK4. It was in the form of 4 mm diameter pellets and had typical BET, basal plane and edge surface areas of 950,182 and 31 $m^2.g^{-1}$ respectively. The ratio of BET to basal plane surface areas was 5.38:1 and the ratio of basal plane to edge surface area was 5.87:1. The carbon was heat treated as follows:

(1) It was treated from room temperature in an inert atmosphere to 1700° C. over a period of 4 hours. When the temperature reached 1700° C. the carbon was allowed to cool in the stream of nitrogen to room temperature.
(2) It was then heated in air in a rotating drier furnace at about 520° C. for a time known from experience (about 4 hours) to give a weight loss of 20%.
(3) It was then heated over a period of 4 hours to 1850° C. in an inert atmosphere as described in (1) above.

After the three heat treatment stages the carbon had the following surface area properties:

| Basal plane surface area (bpsa) | 390 $m^2.g^{-1}$ |

| | |
|---|---|
| BET surface area (BETsa) | 650 $m^2.g^{-1}$ |
| Edge surface area (esa) | 2.3 $m^2.g^{-1}$ |

Ratio of BET/basal plane surface areas: 1.67:1. Ratio of basal plane/edge surface areas: 170:1.

Before impregnation the carbon support material was acid washed by refluxing 50 g quantities of carbon in 200 $cm^3$ of 5% vol HCl in water for 3 hours. It was then washed in distilled water followed by drying in a vacuum oven at 100° C. for at least 24 hours.

Two of the catalysts were prepared by impregnating the support with an aqueous acidic solution of $PdCl_2$ and evaporating the water. They were then dried in a vacuum oven for at least 16 hours at 100° C. They were reduced in a flowing stream of hydrogen at 200° C. for 3 hours. The alkali metal Na or K was then impregnated from aqueous solutions of its nitrates by evaporating the water. The final catalysts were dried in a vacuum oven at 100° C. for at least 16 hours and had the following compositions by weight:

(i) 10% Pd/10% K/Carbon
(ii) 10% Pd/3% Na/Carbon

The catalysts were then reduced in situ in the reactor under 5% $H_2$/He at more than 21,000 $hr^{-1}$ space velocity and less than 10 psig (ca 0.17 MPa absolute). The temperature was increased to 300° C. at 60° C. $hr^{-1}$ and then held at 300° C. for 1 hour before cooling to 150° C. ready for methanol introduction.

The catalyst were then tested for methanol activity in a once through (non-recycle) isothermal micro-reactor using as feed a mixture containing 28% of methanol with the remainder being helium. The reaction was carried out at 1 bar (0.1 mPa) total pressure. Reactions were carried out at varying feed rates and at varying temperatures. The results are given in Table 1.

TABLE 1
Results with P.175 Carbon Based CD Catalysts

| Catalyst | T/°C. | Weight Hourly Space Velocity* | Conversion/ % | Selectivity/ % |
|---|---|---|---|---|
| 10% Pd/10% K | 200 | 4.7 | 41 | 99 |
| " | 250 | 4.7 | 99.4 | 99.4 |
| " | 300 | 4.7 | 100 | 99.4 |
| " | 400 | 4.7 | 100 | 99.4 |
| 10% Pd/3% Na | 300 | 4.7 | 97.3 | 99 |
| " | 300 | 19.0 | 62.0 | 99 |

*Other product largely $CO_2$ and some methane.

Reaction carried out at 1 bar total pressure, 28% methanol, balance helium.

In this table the conversion represents the percentage by weight of methanol consumed. The selectivity is the selectivity to CO production defined as:

Selectivity = moles of CO produced × 100/moles of methanol consumed.

We claim:

1. A process for the conversion of methanol to a mixture of carbon monoxide and hydrogen by passing methanol over a catalyst under conditions such that the concentration of methanol in the feed is higher than the concentration of methanol in the product, which process is characterised in that the catalyst contains palladium metal dispersed on a support and a promoter which is an alkali metal, alkaline earth metal, or a lanthanide, and the support is a graphite-containing carbon having (a) a basal plane surface area of at least 100 m²/g
(b) a ratio of BET surface area to basal plane surface area of not more than 5:1
(c) a ratio of basal plane surface area to edge surface area of at least 10:1.

2. A process according to claim 1 wherein the carbon has a basal plane surface area of at least 150 m²/g.

3. A process according to claim 2 wherein the basal plane surface area is at least 200 m²/g.

4. A process according to claim 1 wherein the ratio of BET to basal plane surface area is not more than 3:1.

5. A process according to claim 1 wherein the carbon has a ratio of basal plane to edge surface area of at least 30:1.

6. A process according to claim 1 wherein the catalyst has been prepared by depositing a palladium halide on the carbon, reducing the palladium halide with hydrogen to eliminate halide, and then depositing a salt of the promoter.

7. A process according to claim 6 wherein the palladium halide and the salt of the promoter are each deposited from separate aqueous solutions.

8. A process according to claim 1 wherein the feedstock is substantially free of synthesis gas components.

9. A process according to claim 2 wherein the feedstock is passed over the catalyst at a temperature in the range 200° to 400° C.

* * * * *